(12) United States Patent
Yokomizo (10) Patent No.: US 12,287,861 B2
(45) Date of Patent: Apr. 29, 2025

(54) INFORMATION PROCESSING APPARATUS AND CONTROL METHOD FOR INFORMATION PROCESSING APPARATUS

(71) Applicant: CANON KABUSHIKI KAISHA, Tokyo (JP)

(72) Inventor: So Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 17/680,098

(22) Filed: Feb. 24, 2022

(65) Prior Publication Data

US 2022/0277069 A1    Sep. 1, 2022

(30) Foreign Application Priority Data

Mar. 1, 2021    (JP) .................. 2021-031790

(51) Int. Cl.
*G06F 21/44*    (2013.01)
(52) U.S. Cl.
CPC ..................... *G06F 21/44* (2013.01)
(58) Field of Classification Search
CPC ....................................................... G06F 21/44
See application file for complete search history.

(56) References Cited

U.S. PATENT DOCUMENTS

| | | | | |
|---|---|---|---|---|
| 9,118,656 B2* | 8/2015 | Ting | ................... | H04L 63/0815 |
| 2007/0118745 A1* | 5/2007 | Buer | ..................... | G06F 21/34 |
| | | | | 713/168 |
| 2007/0245153 A1* | 10/2007 | Richtsmeier | ......... | H04N 1/4413 |
| | | | | 713/186 |
| 2011/0225625 A1* | 9/2011 | Wolfson | ................ | H04L 63/205 |
| | | | | 726/1 |
| 2012/0110329 A1* | 5/2012 | Brown | .................... | G06F 21/31 |
| | | | | 713/168 |

FOREIGN PATENT DOCUMENTS

| | | |
|---|---|---|
| JP | 2006007464 A | 1/2006 |
| JP | 2008129956 A | 6/2008 |
| JP | 2019155610 A | 9/2019 |

* cited by examiner

*Primary Examiner* — William S Powers
(74) *Attorney, Agent, or Firm* — Canon U.S.A., Inc. IP Division

(57) ABSTRACT

A control method for an information processing apparatus controlled by a computer is executed by the computer and includes performing a first input to accept an input of first authentication information, performing a second input to accept an input of another authentication information different from the first authentication information, executing first processing on condition of success of authentication with the first authentication information input in the first input and success of authentication with the another authentication information input in the second input, and executing second processing on condition of success of at least one of authentication with the first authentication information input in the first input or authentication with the another authentication information input in the second input.

8 Claims, 11 Drawing Sheets

| FUNCTION | FIRST AUTHENTICATION FACTOR | SECOND AUTHENTICATION FACTOR |
|---|---|---|
| COPY | ID/PW | NONE |
| FAX | ID/PW | IC CARD |
| SCAN AND SEND | ID/PW | IC CARD |
| USE SAVED FILE | ID/PW | NONE |
| INTRODUCTION OF CONVENIENT FUNCTIONS | ID/PW | NONE |
| WEB BROWSER | ID/PW | NONE |

FIG.5-2

| FUNCTION 541 | AUTHENTICATION FACTOR A (LOGIN) 542 | FIRST AUTHENTICATION FACTOR 543 | SECOND AUTHENTICATION FACTOR 544 |
|---|---|---|---|
| COPY | IC CARD | ID/PW | NONE |
| FAX | | ID/PW | BIOMETRIC AUTHENTICATION |
| SCAN AND SEND | | ID/PW | BIOMETRIC AUTHENTICATION |
| USE SAVED FILE | | ID/PW | NONE |
| INTRODUCTION OF CONVENIENT FUNCTIONS | | ID/PW | NONE |
| WEB BROWSER | | ID/PW | NONE |

FIG.9

INFORMATION PROCESSING APPARATUS AND CONTROL METHOD FOR INFORMATION PROCESSING APPARATUS

BACKGROUND

Field of the Disclosure

The present disclosure relates to an information processing apparatus, a method, a system, and the like to which user authentication is applicable.

Description of the Related Art

Examples of security measures for an image forming apparatus having various kinds of functions include a user authentication function employed at the time of using the image forming apparatus. There is a plurality of types of the user authentication function, including asking a user to enter an identification (ID) and a password, asking for authentication with an integrated circuit (IC) card, and asking for a fingerprint or face authentication. Known is a method for enhancing security by performing two-factor authentication including IC card authentication and biometric authentication as discussed in Japanese Patent Application Laid-Open No. 2019-155610.

SUMMARY

According to embodiments of the present disclosure, a control method for an information processing apparatus controlled by a computer is executed by the computer and includes performing a first input to accept an input of first authentication information, performing a second input to accept an input of another authentication information different from the first authentication information, executing first processing on condition of success of authentication with the first authentication information input in the first input and success of authentication with the another authentication information input in the second input, and executing second processing on condition of success of at least one of authentication with the first authentication information input in the first input or authentication with the another authentication information input in the second input.

Further features of the present disclosure will become apparent from the following description of exemplary embodiments with reference to the attached drawings.

BRIEF DESCRIPTION OF THE DRAWINGS

FIG. 4-1 is a diagram illustrating an example of a screen for a first authentication factor.

FIG. 4-2 is a diagram illustrating an example of a screen for a second authentication factor.

FIG. 5-1 is a diagram illustrating an example of a table that defines functions of the image forming apparatus and respective authentication factors for the functions.

FIG. 5-2 is a diagram illustrating another example of a table that defines the functions of the image forming apparatus and respective authentication factors for the functions.

FIGS. 5-3A and 5-3B are diagrams each illustrating still another example of a table that defines the functions of the image forming apparatus and respective authentication factors for the functions.

DESCRIPTION OF THE EMBODIMENTS

Figure 1:
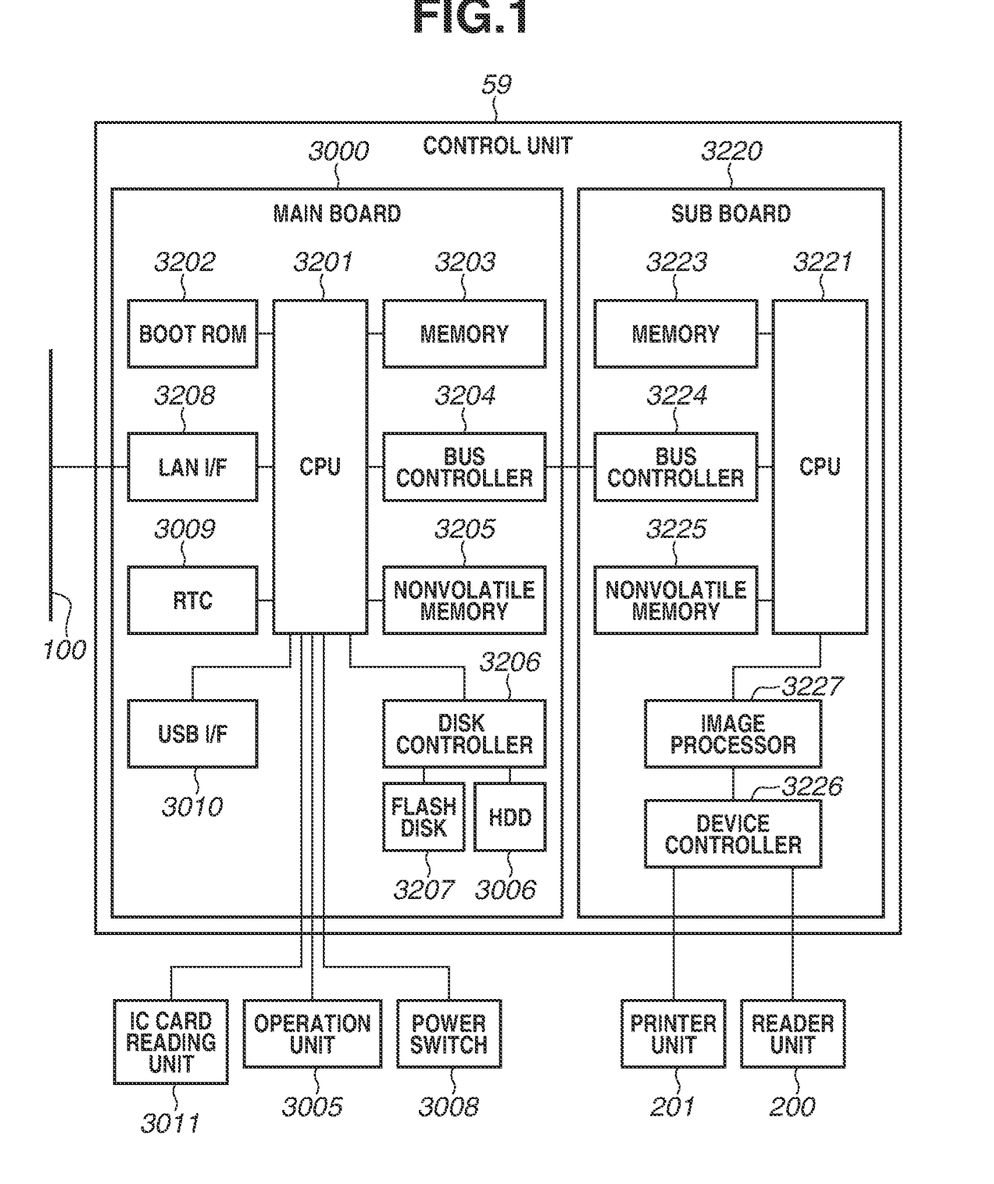
FIG. 1 is a block diagram illustrating an example of a controller board of an image forming apparatus.

Embodiments of the present disclosure will be described below with reference to the accompanying drawings. FIG. 1 is a block diagram illustrating a controller board of an image forming apparatus according to an exemplary embodiment. A controller board (control unit 59) is a portion that performs job control for image formation, and includes an input/output unit, such as an operation unit and a local area network (LAN). The control unit 59 is composed of a main board 3000 and a sub board 3220.

The image forming apparatus may be a multi-function apparatus, a printer, or the like. These image forming apparatuses are examples of an information processing apparatus.

The main board 3000 functions as a computer. The main board 3000 includes a central processing unit (CPU) 3201 that controls the whole of the main board 3000. The main board 3000 also includes a boot read-only memory (ROM) 3202 including a boot program, a memory 3203 used as a work memory by the CPU 3201, and a bus controller 3204 having a function of a bridge to an external bus. The main board 3000 further includes a nonvolatile memory 3205 and a disk controller 3206 that controls a storage device. The main board 3000 also includes a flash disk 3207, which is a relatively low-capacity storage device composed of a semiconductor device, and a hard disk drive (HDD) 3006 that is used as an auxiliary memory device. The main board 3000 further includes a LAN interface (I/F) 3208 for establishing network connection with an external network 100, and a real time clock (RTC) 3009 that manages a time. Furthermore, the main board 3000 is connected to an operation unit 3005, a power switch 3008, and the like. The operation unit 3005 is provided with a liquid crystal display unit having a touch panel function and various kinds of hardware keys, and functions as a display unit that displays information and as an acceptance unit that accepts a user's instruction. In the present exemplary embodiment, the operation unit 3005 is used to display a function selection screen of the image forming apparatus and a screen at the time of user authentication performed by an authentication means. The power switch 3008 is for powering on the multi-function apparatus. An integrated circuit (IC) card reading unit 3011 is a device for reading electronic information recorded in an IC card, and used at the time of user authentication with the IC card.

The sub board 3220 is a sub system including a relatively small general-purpose CPU system and image processing hardware. The sub board 3220 includes a CPU 3221 that controls the whole of the sub board 3220, and a memory 3223 that is used as a work memory by the CPU 3221. The sub board 3220 includes a bus controller 3224 having a function of a bridge to the external bus, a nonvolatile memory 3225, an image processor 3227 that performs real-time digital image processing, and a device controller 3226. The device controller 3226 controls a printer unit 201 and a reader unit 200.

FIG. 1 is a block diagram illustrated in a simplified manner. For example, the CPU 3201, the CPU 3221, and the like each include multitudes of CPU peripheral hardware such as a chip set, a bus bridge, and a clock generator, but are illustrated in a simplified manner because the CPU peripheral hardware is unnecessary for description of embodiments of the present disclosure, and this block configuration does not limit the present disclosure.

The reader unit 200 is a device that optically scans a document and converts the scanned document to a digital image, and transmits the converted image data to the device controller 3226. The printer unit 201 is a device for printing image data on fed paper. A copy function, which is one of a plurality of functions provided by the image forming apparatus, is implemented by the printer unit 201 printing image data read by the reader unit 200.

Figure 2:
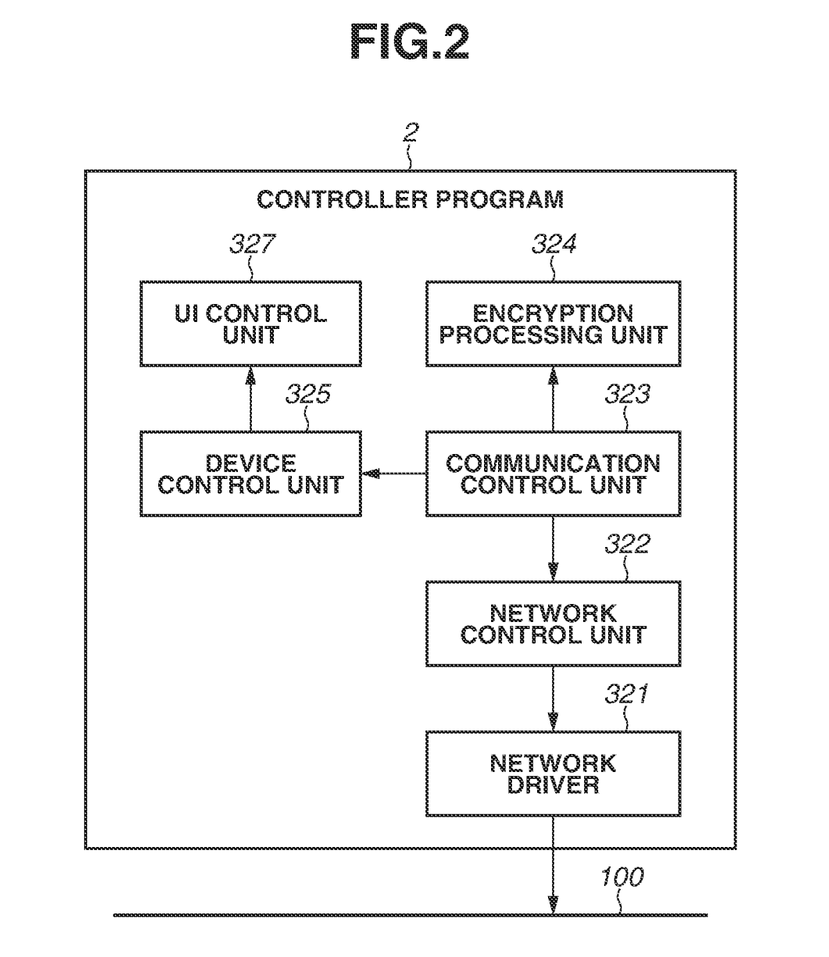
FIG. 2 is a bock diagram illustrating an example of a software module.

FIG. 2 is a block diagram illustrating a software module of the image forming apparatus according to the present exemplary embodiment. The software module illustrated in FIG. 2 is implemented by the CPU 3201 loading a program in a memory and executing the program.

A network driver 321 controls the LAN I/F 3208 connected to the network 100 and transmits/receives data to/from the outside via the network 100. A network control unit 322 controls communication of a transport layer or lower layers in a network communication protocol such as a Transmission Control Protocol/Internet Protocol (TCP/IP), and transmits/receives data. A communication control unit 323 is a module for controlling a plurality of communication protocols. An encryption processing unit 324 is a software module for executing various kinds of encryption processing such as encryption of data, decryption processing, generation and verification of an electronic signature, and generation of a hash value. Also in encryption communication processing executed by the communication control unit 323 using a Transport Layer Security (TLS) protocol or the like, the encryption processing unit 324 executes the encryption processing. A device control unit 325 is a software module for executing functions of the image forming apparatus, such as various kinds of authentication processing, print by the printer unit 201, and reading of a document by the reader unit 200. A user interface (UI) control unit 327 is a software module for controlling the operation unit 3005. The control portion having the software configuration described above with reference to FIG. 2 is hereinafter referred to as a controller program 2. In the present specification, the software of the controller program 2 is executed by the CPU 3201 in the control unit 59. In the following sequences and flowcharts, the controller program 2 is stored in a storage means that is any one of the memory 3203, the HDD 3006, and the flash disk 3207 described above. The controller program 2 is read out from the storage means of various kinds, and executed by the CPU 3201.

Figure 3:
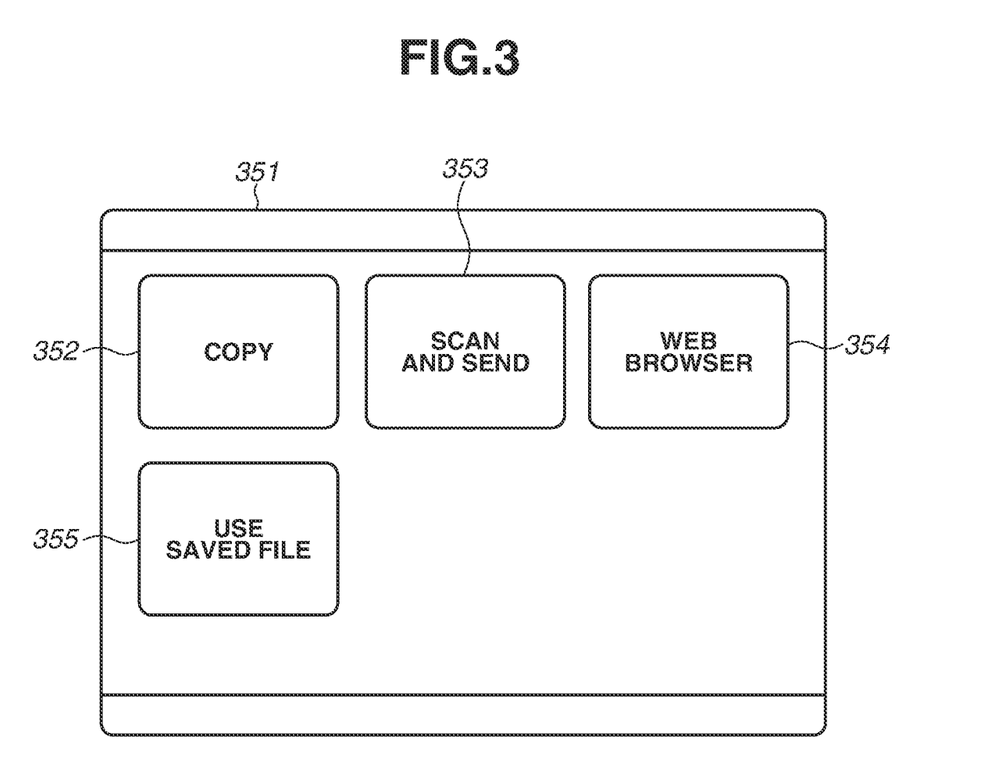
FIG. 3 is a diagram illustrating an example of a function selection screen.
Figures 3A, 5:
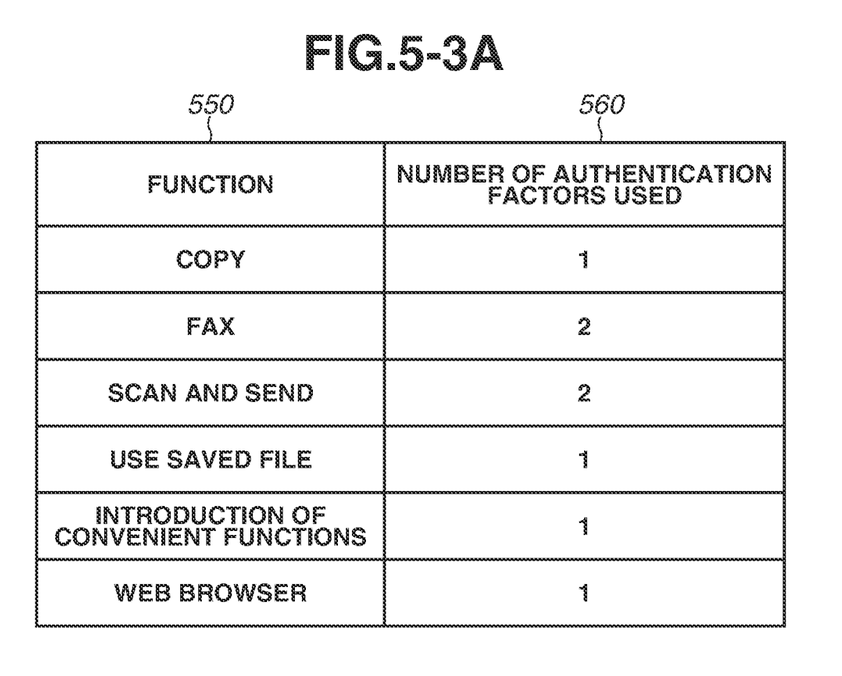
Figures 3B, 5:
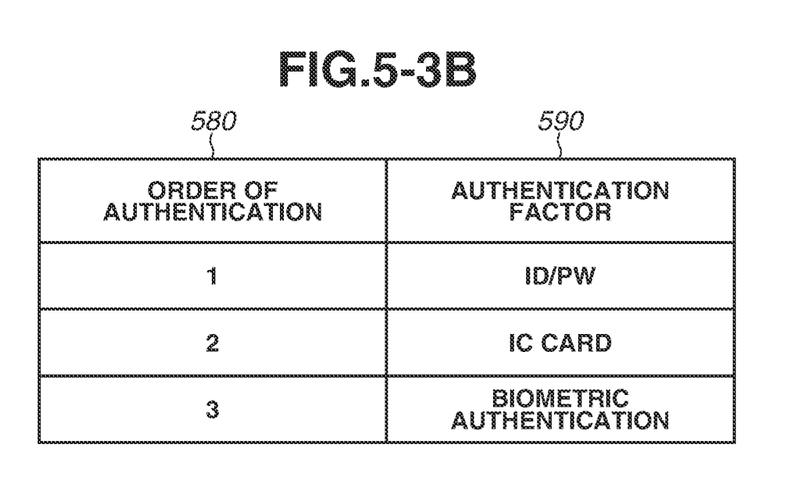

FIG. 3 illustrates an example of a screen for selecting a function of the image forming apparatus. A function selection screen 351 is displayed on the operation unit 3005. Execution of various kinds of functions is started by selection of respective displayed buttons in FIG. 3. There is a copy button 352 corresponding to a copy function. There is a scan and send button 353 for transmitting image data read by the reader unit 200 to the outside. Furthermore, there are a web browser button 354 for browsing a web, and a use saved file button 355 for printing image data saved in the HDD 3006 of the image forming apparatus. Functions discussed herein are not limited to the displayed functions in FIG. 3. In a case where authentication is set, a screen corresponding to each of the above-mentioned functions of the buttons is displayed on condition of success of the authentication. An error screen or the like may be displayed when the authentication fails.

The following processing is performed when the authentication succeeds. When the copy button 352 is pressed, a copy setting screen is displayed on the operation unit 3005. When a copy paper size and a magnification ratio are designated and a start button is pressed, a document sheet is read by a scanner of the image forming apparatus. A print unit 210 of the image forming apparatus performs copy by printing on another sheet with the set magnification ratio or the like.

When the scan and send button 353 is pressed, a destination setting screen is displayed on the operation unit 3005. A desired destination is set on the destination setting screen, and a start button is pressed on the same screen of the operation unit 3005. A sheet such as printed paper is read by the scanner of the image forming apparatus, and image data is generated. The image data is stored in the HDD 3006 and transmitted via the network 100. When the web browser button 354 is pressed, a browser screen is displayed on the operation unit 3005 so that a page of a web server inside or outside the image forming apparatus can be browsed.

Figure 41:
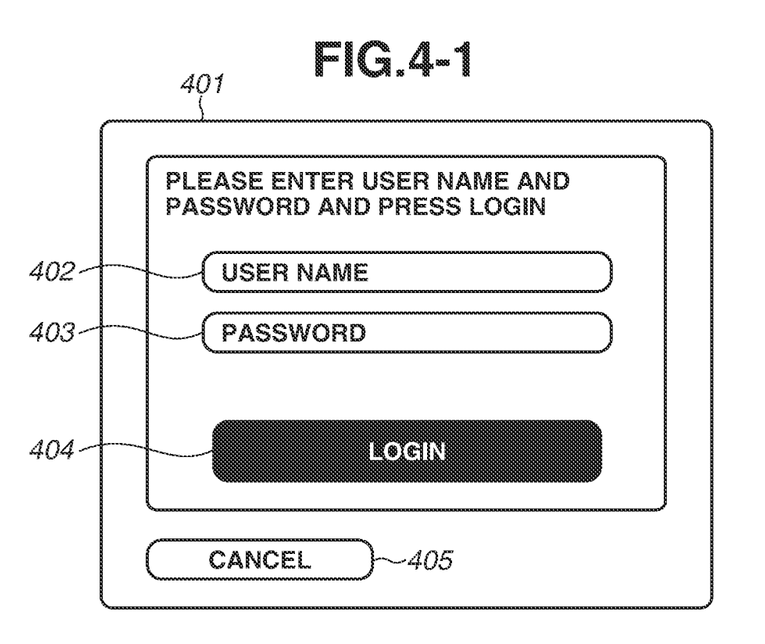

FIG. 4-1 illustrates an example of a first authentication factor used at the time of authentication in the image forming apparatus. An authentication screen 401 is an authentication means for authentication with a user name and a password. Authentication is started by the user entering the user name in a user name field 402 and the password in a password field 403 and pressing a login button 404. In a case where the authentication is not performed, pressing a cancel button 405 ends the authentication screen 401. The password mentioned herein is not limited to a word. The password may be characters in a language other than Japanese such as English, numbers, or a combination thereof.

Figure 42:
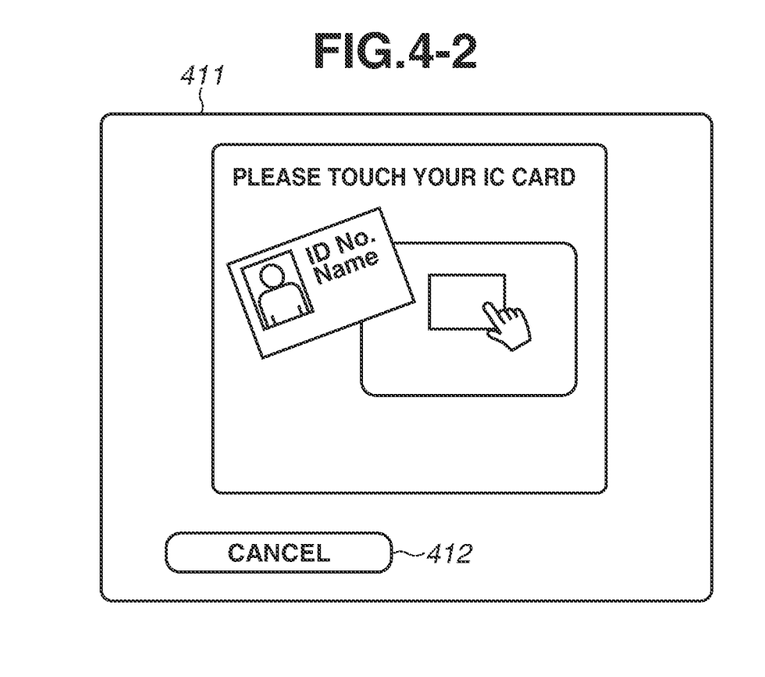

FIG. 4-2 illustrates an example of a second authentication factor used at the time of authentication in the image forming apparatus. An authentication screen 411 is an authentication means involving authentication with the IC card. Authentication is started by the user bringing the IC card closer to the IC card reading unit 3011. In a case where the authentication is not performed, pressing a cancel button 412 ends the authentication screen 411. A bit sequence that enables authentication of the user is encrypted and stored in the IC card. The bit sequence is not limited to a character sequence. Information stored in the IC card can be information that enables confirmation that the IC card in which the bit sequence is stored belongs to the user, and may be any predetermined information that enables authentication of the user. The reading unit 3011 reads the bit sequence stored in the IC card, and decodes and analyzes the bit sequence under control of the CPU 3201.

Figure 51:
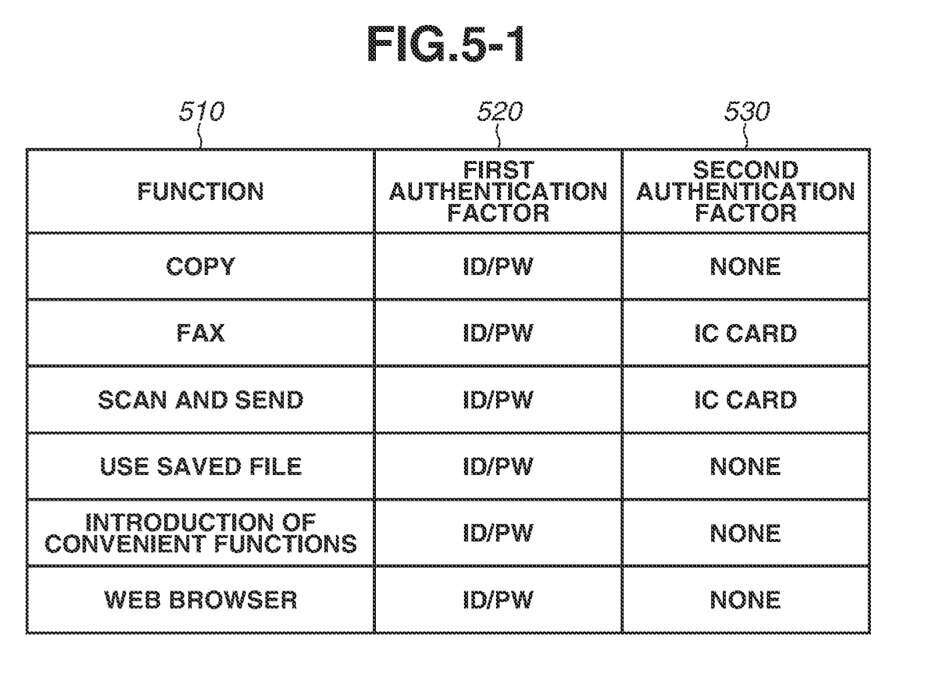

A first control method for implementing embodiments of the present disclosure will now be described with reference to the accompanying drawings. FIG. 5-1 is a diagram illustrating an example of a table that defines functions of the image forming apparatus and respective authentication factors for the functions.

A column 510 defines each function of the image forming apparatus. A column 520 defines each first authentication factor used when a corresponding function is used. A column 530 defines each second authentication factor used when a corresponding function is used. FIG. 5-1 indicates that, for example, in a case of the copy function, a user ID and a password are used as the first authentication factor, and nothing is used as the second authentication factor.

That is, in the present exemplary embodiment, copy is executable if the ID and the password are entered. A use saved file function is a function for reading out or writing a saved file stored in the HDD 3006 or the flash disk 3207. The use saved file function is also executable if the ID and the password are entered. Introduction of convenient functions is a guide function for explaining the functions of the multi-function apparatus. The introduction of convenient functions is also executable if the ID and the password are entered. Additionally, the web browser is stored in the HDD 306 in the multi-function apparatus, and pressing the web browser button 354 illustrated in FIG. 3 causes the CPU 3201 to execute the web browser. This function is also executable if the ID and the password are entered.

When the copy button 352, the use saved file button 355, or the web browser button 354 is pressed, the screen illustrated in FIG. 4-1 is displayed. When the user name and the password are entered on the screen illustrated in FIG. 4-1, each function is executed. Authentication illustrated in FIG. 4-2 is not requested when each of these functions is executed. On the other hand, the scan and send function uses authentication with the IC card in addition to authentication with the ID and the password. As illustrated in FIG. 5-1, a setting for providing a strong guard can be made with respect to the functions for transmitting data to the outside.

For example, in a case where the scan and send button 353 illustrated in FIG. 3 is pressed, the screen illustrated in FIG. 4-1 is displayed, and the user name and the password are entered. When the authentication succeeds, the screen is switched to a screen illustrated in FIG. 4-2.

When the authentication with the IC card succeeds, a screen for scan and send is displayed.

Thereafter, a start button is enabled, a destination setting becomes available, and the scan and send is permitted. When the authentication illustrated in FIG. 4-1 or the authentication illustrated in FIG. 4-2 fails, an error screen is displayed, and the processing ends.

Figure 52:
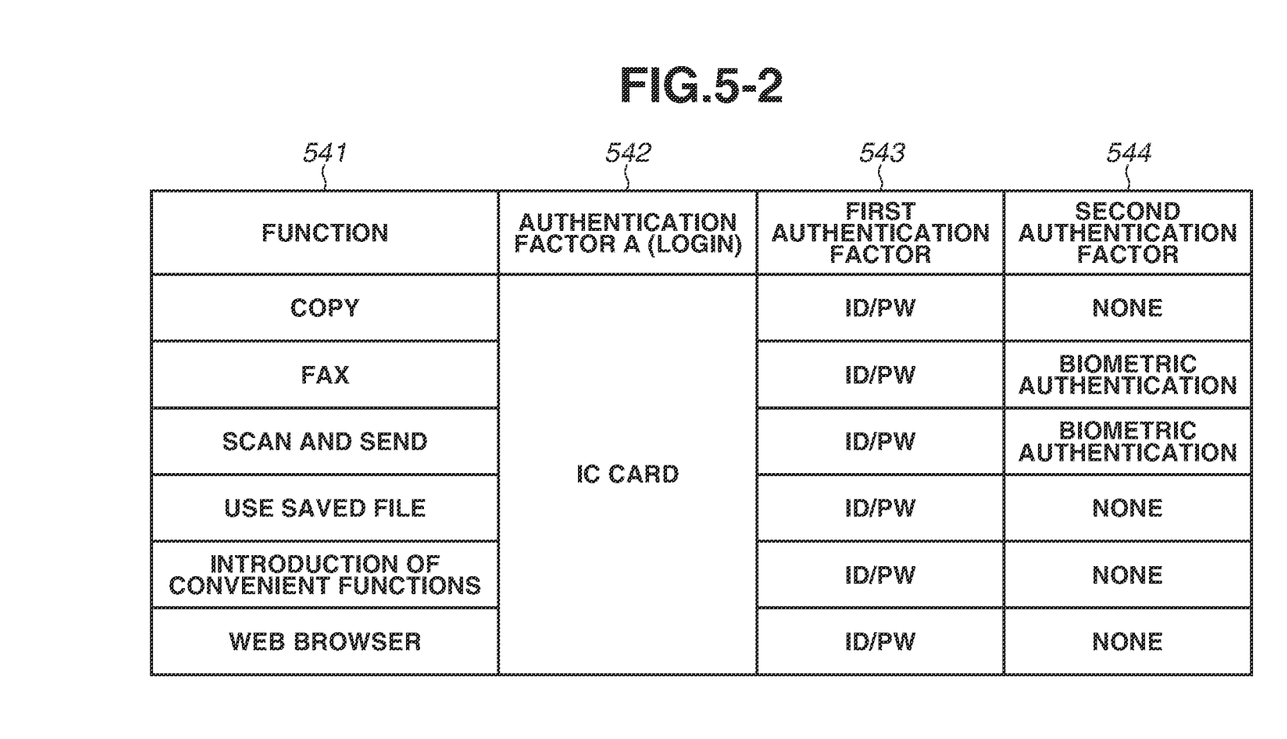

Of course, an administrator can delete or write data in the tables illustrated in FIG. 5-1 and FIG. 5-2, respectively, from a browser of an external device or the operation unit 3005 on condition of entry of a password of the administrator or transition to a maintenance mode. For example, a status illustrated in FIG. 5-1 can be rewritten to a status illustrated in FIG. 5-2. Alternatively, in each of FIGS. 5-1 and 5-2, the first authentication factor can be omitted, or the second authentication factor can be rewritten to "NONE", "IC CARD", "BIOMETRIC AUTHENTICATION", or the like. Rewriting of the columns 520, 530, and 542 to 544 can be freely performed on a function-by-function basis in conformity with a security policy of an administration division.

Figure 6:
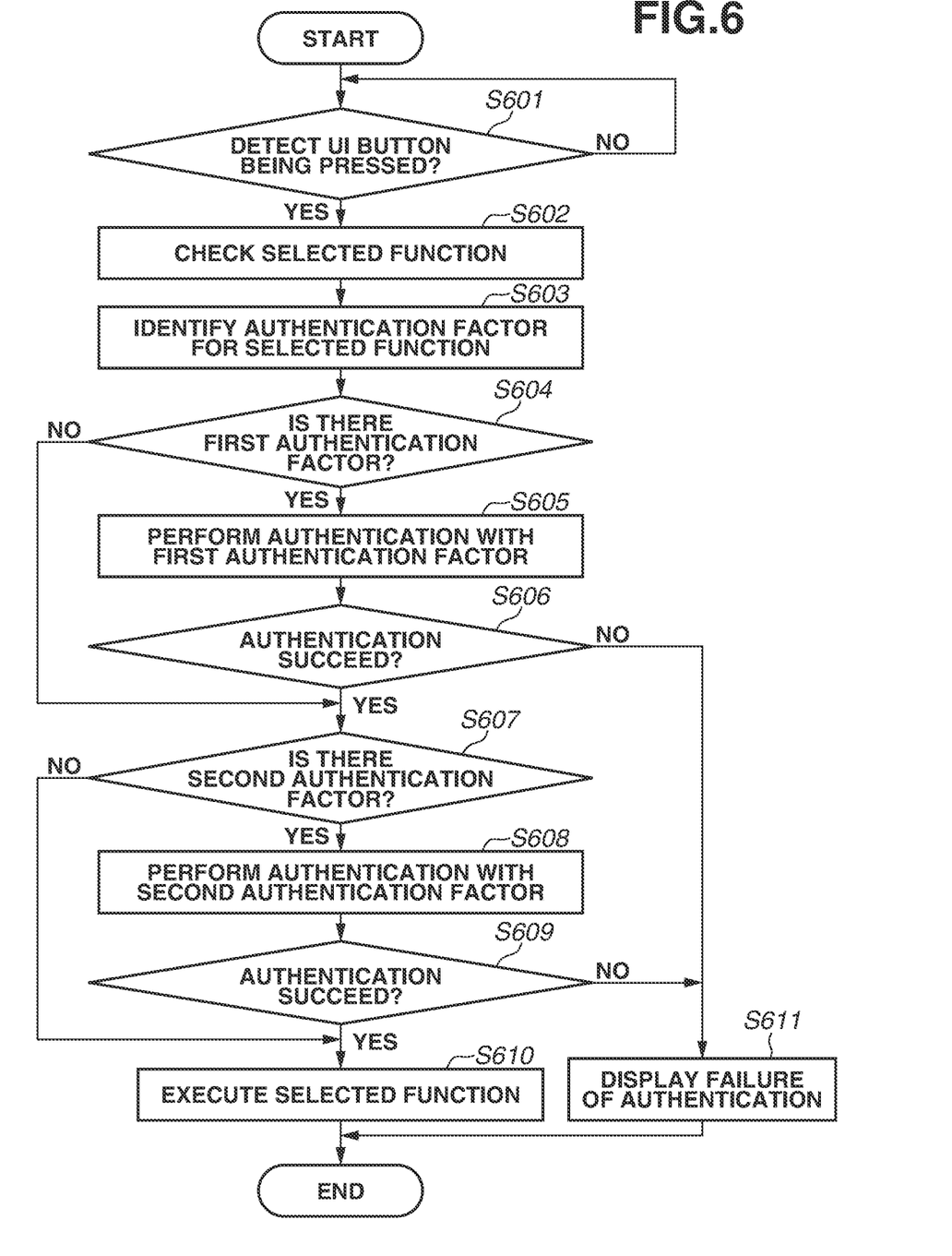
FIG. 6 is a diagram illustrating an example of a first authentication flow.

FIG. 6 illustrates the flow from authentication with an authentication factor defined in FIG. 5-1 to usage of the function in a case where a function of the image forming apparatus is to be used. The subject in the following description is the controller program 2 and processing is executed by the CPU 3201. In step S601, when the user presses a function button displayed on the screen illustrated in FIG. 3 to use the corresponding function of the image processing apparatus, the controller program 2 detects whether the function button has been pressed. In a case where the controller program 2 detects that the function button has been pressed (YES in step S601), the processing proceeds to step S602. In step S602, the controller program 2 then checks a function of the pressed function button. In step S603, the controller program 2 uses the table illustrated in FIG. 5-1 to identify authentication factors for using the function. For example, assume that the controller program 2 detects that the user has pressed the scan and send button 353. When the scan and send function is used, the controller program 2 then identifies that authentication with the user ID and the password as the first authentication factor and authentication with the ID card as the second authentication factor are to be performed.

In step S604, the controller program 2 checks whether there is the first authentication factor. In a case where the controller program 2 confirms that there is the first authentication factor (YES in step S604), the processing proceeds to step S605. In step S605, the controller program 2 performs authentication with the first authentication factor identified in step S603. At this time, the controller program 2 displays the screen illustrated in FIG. 4-1 on the operation unit 3005. When the user enters the user ID and the password and presses the login button 404, the controller program 2 detects that the login button 404 has been pressed, and performs authentication. In step S606, the controller program 2 determines whether first authentication succeeds. Consequently, in a case where the first authentication succeeds (YES in step S606), the processing proceeds to step S607. In step S607, the controller program 2 checks whether there is the second authentication factor. In a case where the controller program 2 confirms that there is the second authentication factor (YES in step S607), the processing proceeds to step S608. In step S608, the controller program 2 performs authentication with the second authentication factor identified in step S603. At this time, the controller program 2 displays the screen illustrated in FIG. 4-2 on the operation unit 3005. When the user brings the IC card closer to the IC card reading unit 3011, the controller program 2 detects the IC card, and performs authentication. In step S609, the controller program 2 determines whether second authentication succeeds. In a case where the second authentication succeeds (YES in step S609), the processing proceeds to step S610. In step S610, the controller program 2 executes the function identified in step S602 and ends the processing. In a case where the authentication fails as a result of authentication trial in step S606 or step S609 (NO in step S606 or step S609), the processing proceeds to step S611. In step S611, the controller program 2 displays on the operation unit 3005 that the authentication has failed. The controller program 2 then ends the processing without executing the function identified in step S602. In a case where there is no authentication factor in step S604 or step S607 (NO in step S604 or step S607), the processing skips the authentication and proceeds to the subsequent step. For example, when the user presses the copy button 352, the controller program 2 performs the first authentication, thereafter, executes the copy function without performing the second authentication because the second authentication factor is not defined, and ends the processing.

Second Exemplary Embodiment of Authentication

A second control method for implementing embodiments of the present disclosure will now be described with reference to the accompanying drawings. Parts different from the exemplary embodiment described above will be particularly described.

Figure 7:
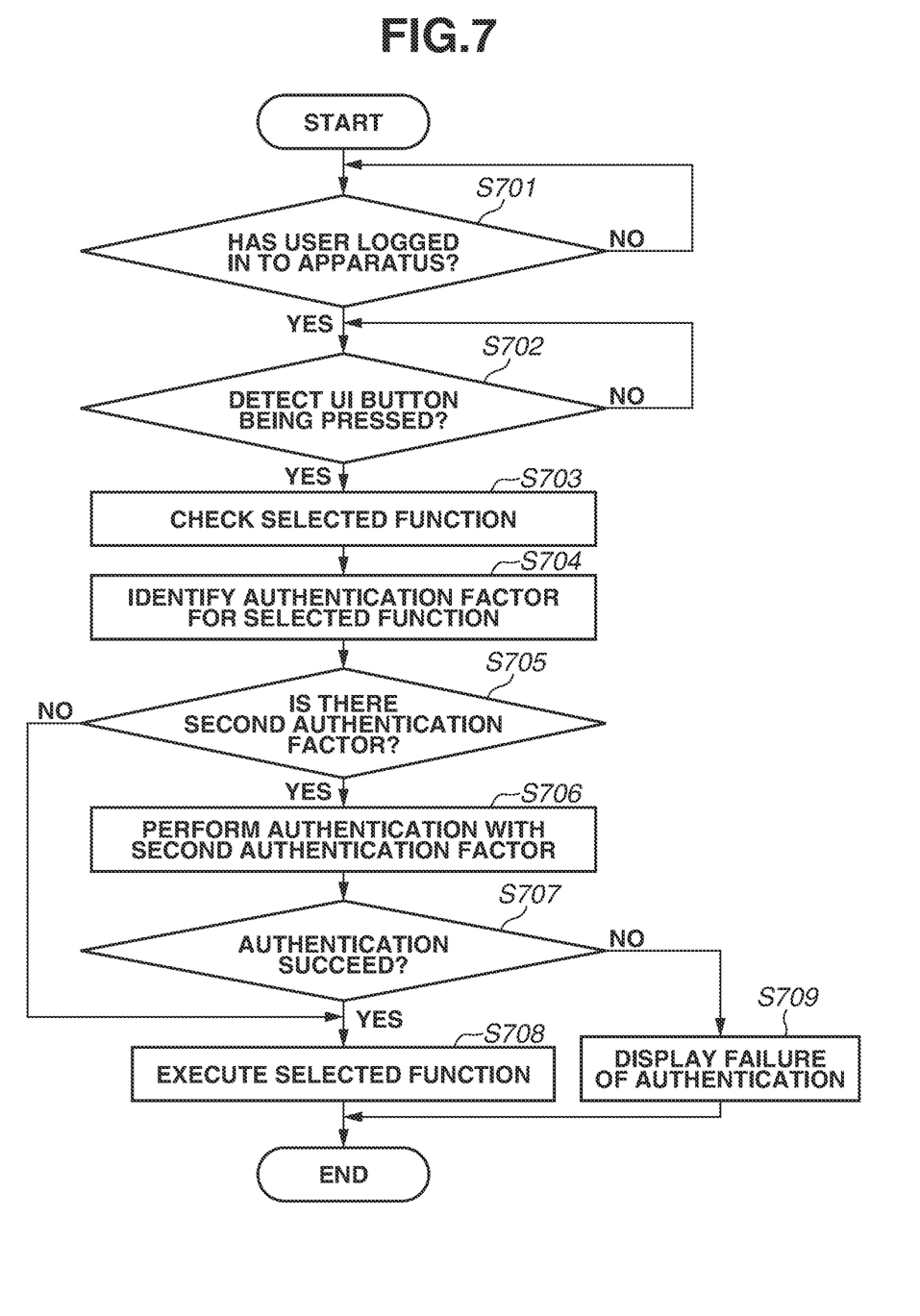
FIG. 7 is a diagram illustrating an example of a second authentication flow.

FIG. 7 illustrates a case where authentication is necessary when the user uses the image forming apparatus and when the user uses a function, illustrating the flow from a user logging in to the image forming apparatus to usage of the function with additional authentication being performed.

When the user uses the image forming apparatus, the controller program 2 displays the screen illustrated in FIG. 4-1 on the operation unit 3005, and performs authentication with the user ID and the password as the first authentication factor. In step S701, the controller program 2 determines whether the user has logged in to the apparatus. In a case where the controller program 2 determines that the user has logged in to the apparatus (YES in step S701), the processing proceeds to step S702. The user presses a function button displayed on the screen illustrated in FIG. 3 to use the corresponding function of the image processing apparatus. In step S702, the controller detects whether the function button has been pressed. In a case where the controller program 2 detects that the function button has been pressed (YES in step S702), the processing proceeds to step S703. In step S703, the controller program 2 checks the function of the pressed button. In step S704, the controller program 2 uses the table illustrated in FIG. 5-1 to identify authentication factors for using the function. In step S705, the controller program 2 checks whether there is the second authentication factor at this point of time, because the authentication with the first authentication factor has already been performed. In a case where the controller program 2 confirms that there is the second authentication factor (YES in step S705), the processing proceeds to step S706. In step S706, the controller program 2 performs authentication with the second authentication factor identified in step S704. At this time, the controller program 2 displays the screen illustrated in FIG. 4-2 on the operation unit 3005. When the user brings the IC card closer to the IC card reading unit 3011, the controller program 2 detects the IC card, and performs authentication. In step S707, the controller program 2 determines whether second authentication succeeds. In a case where the second authentication succeeds (YES in step S707), the processing proceeds to step S708. In step S708, the controller program 2 executes the function identified in step S703 and ends the processing. In a case where authentication fails as a result of authentication trial in step S707 (NO in step S707), the processing proceeds to step S709. In step S709, the controller program 2 displays on the operation unit 3005 (not illustrated) that the authentication has failed, and ends the processing without executing the function checked in step S703. In a case where there is no authentication factor in step S705 (NO in step S705), the controller program 2 executes the function checked in step S703 without performing the authentication, and ends the processing. For example, when the user presses the copy button 352, the controller program 2 executes the copy function without performing the second authentication, and ends the processing.

Third Exemplary Embodiment of Authentication

A third control method for implementing embodiments of the present disclosure will now be described with reference to the accompanying drawings. Parts different from the exemplary embodiments described above will be particularly described.

FIG. 5-2 illustrates the table that defines the functions of the image forming apparatus and authentication factors for the functions.

A column 541 defines each function of the image forming apparatus. The column 543 defines each first authentication factor used when a corresponding function is used. The column 544 defines each second authentication factor used when a corresponding function is used. For example, in a case of the scan and send function, the table indicates that the user ID and the password are used as the first authentication factor, and biometric authentication is used as the second authentication factor. The column 542 defines an authentication factor used in common when the user logs in to the image forming apparatus.

Figure 9:
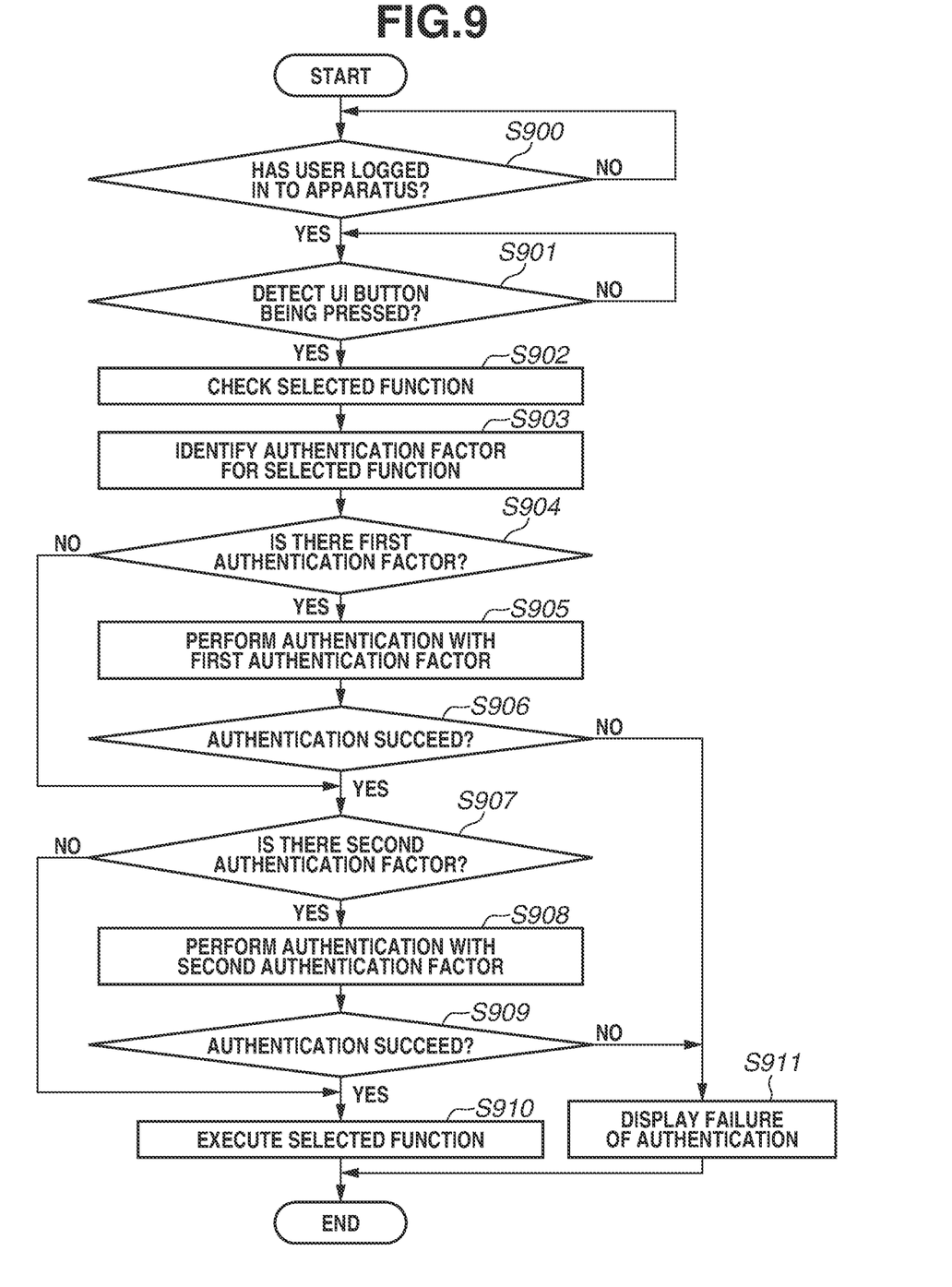
FIG. 9 is a diagram illustrating an example of a fourth authentication flow.

FIG. 9 illustrates a flow from when a user uses the image forming apparatus, in a case where authentication is necessary at the time when the user uses the image forming apparatus, to usage of a function of the image forming apparatus, the usage of the function further requiring additional authentication with an authentication factor defined in FIG. 5-2. The controller program 2 displays the screen illustrated in FIG. 4-2, and the user uses the image forming apparatus. At this time, when the user brings the IC card closer to the IC card reading unit 3011, the controller program 2 detects the IC card, which is an authentication factor A, and performs authentication. In step S900, the controller program 2 determines whether the user has logged in to the image forming apparatus. In a case where the user has logged in to the image forming apparatus (YES in step S900), the processing proceeds to step S901. In step S901, when the user presses a function button displayed on the screen illustrated in FIG. 3 to use the corresponding function of the image processing apparatus, the controller program 2 detects whether the function button has been pressed. In a case where the controller program 2 detects that the function button has been pressed (YES in step S901), the processing proceeds to step S902. In step S902, the controller program 2 checks a function of the pressed function button. In step S903, the controller program 2 uses the table illustrated in FIG. 5-2 to identify authentication factors for using the function. For example, in a case where the controller program 2 detects that the user has pressed the scan and send button 353, the controller program 2 identifies necessity of authentication with the user ID and the password as the first authentication factor and necessity of biometric authentication as the second authentication factor when the scan and send function is used. In step S904, the controller program 2 checks whether there is the first authentication factor. In a case where the controller program 2 confirms that there is the first authentication factor (YES in step S904), the processing proceeds to step S905. In step S905, the controller program 2 performs authentication with the first authentication factor identified in step S903. At this time, the controller program 2 displays the screen illustrated in FIG. 4-1 on the operation unit 3005. When the user enters the user ID and the password and presses the login button 404, the controller program 2 detects that the login button 404 has been pressed, and performs authentication. In step S906, the controller program 2 determines whether first authentication succeeds. In a case where the first authentication succeeds (YES in step S906), the processing proceeds to step S907. In step S907, the controller program 2 checks whether there is the second authentication factor. In a case where the controller program 2 confirms that there is the second authentication factor (YES in step S907), the processing proceeds to step S908. In step S908, the controller program 2 performs authentication with the second authentication factor identified in step S903. At this time, the controller program 2 performs collation with a preliminarily registered physical feature with which an individual person can be identified, such as a fingerprint and a vein (not illustrated), and performs the biometric authentication. In step S909, the controller program 2 determines whether second authentication succeeds. In a case where the second authentication succeeds (YES in step S909), the processing proceeds to step S910. In step S910, the controller program 2 executes the function checked in step S902 and ends the processing. In a case where authentication fails as a result of authentication trial in step S906 or step S909 (NO in step S906 or step S909), the processing proceeds to step S911. In step S911, the controller program 2 displays that the authentication fails on the operation unit 3005 (not illustrated), and ends the processing without executing the function checked in step S902. In a case where there is no authentication factor in step S904 or step S907 (NO in step S904 or step S907), the processing skips the authentication and proceeds to the subsequent step. For example, when the user presses the copy button 352, the controller program 2 performs the first authentication, thereafter, executes the copy function without performing the second authentication because the second authentication factor is not defined, and ends the processing.

Fourth Exemplary Embodiment of Authentication

A fourth control method for implementing embodiments of the present disclosure will now be described with reference to the accompanying drawings.

FIG. 5-3A illustrates a table that defines the functions of the image forming apparatus and authentication factors for the functions. A column 550 defines each function of the image forming apparatus. A column 560 defines the number of authentication factors used when a corresponding function is used. For example, in a case of the scan and send function, the table indicates that authentication with two factors is used when this function is used. A table illustrated in FIG. 5-3B defines the order of authentication and a corresponding authentication factor used at the time of authentication in the image forming apparatus. For example, the table indicates that the user ID and the password are used as an authentication factor ranked first in the order of authentication 580, and authentication with the IC card is used as an authentication factor ranked second.

Figure 8:
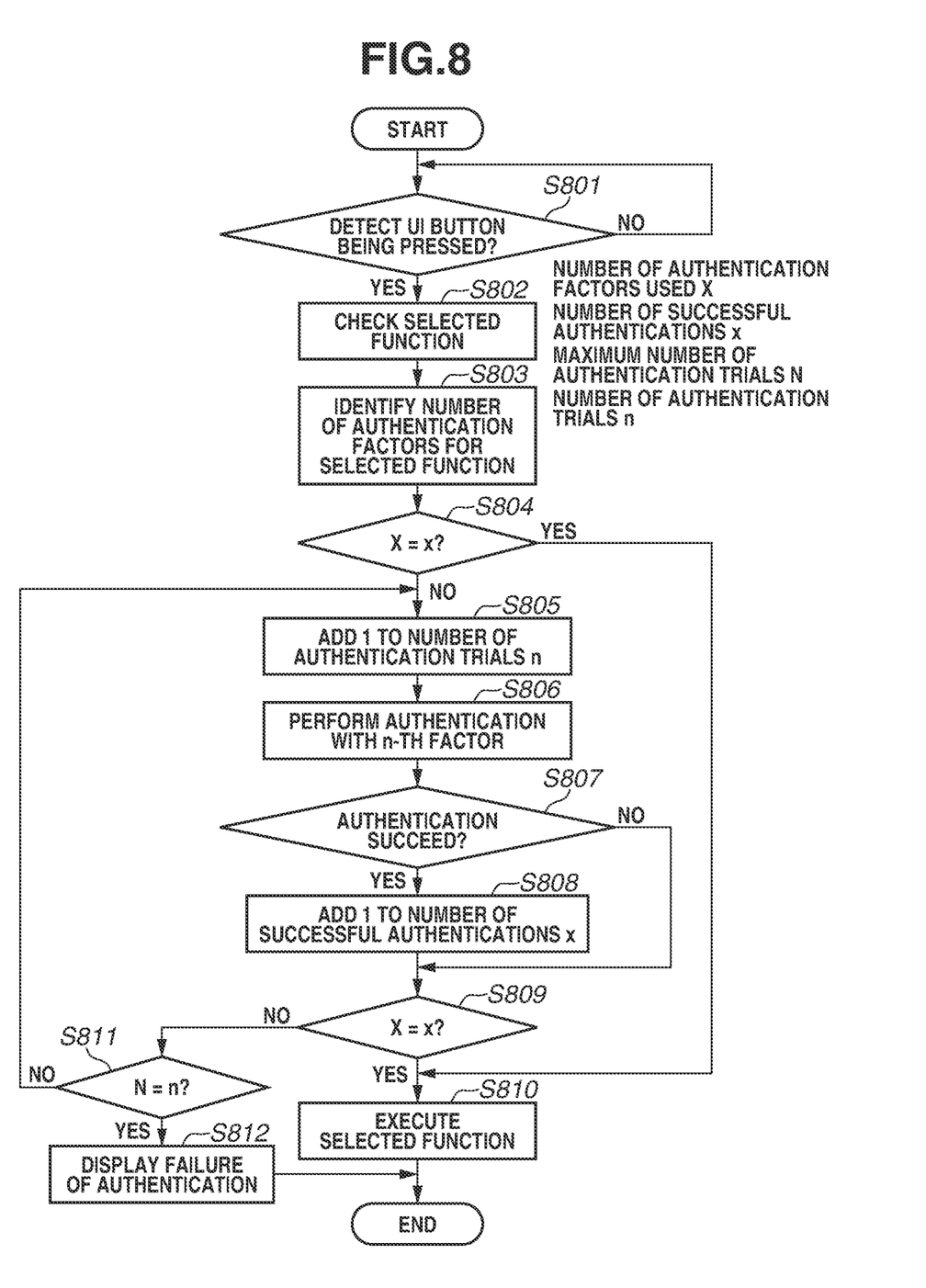
FIG. 8 is a diagram illustrating an example of a third authentication flow.

FIG. 8 illustrates, when a function of the image forming apparatus is used, the flow from authentication with authentication factor(s), the number of which is defined in FIG. 5-3A, to usage of the function. In step S801, when the user presses a function button displayed on the screen illustrated in FIG. 3 to use the corresponding function of the image processing apparatus, the controller program 2 detects whether the function button has been pressed. In a case where the controller program 2 detects that the function button has been pressed (step S801), the processing proceeds to step S802. In step S802, the controller program 2 checks the function of the pressed button. In step S803, the controller program 2 uses the table illustrated in FIG. 5-3 to check the number of authentication factors for using the function. For example, in a case where the user presses the scan and send button 353, the controller program 2 confirms two types of authentication factors are used to use the scan and send function. Subsequently, the processing proceeds to an authentication step. Assume that the number of authentication factors checked in step S803 is X, the number of successful authentications is x, a maximum number of authentication trials is N, and a current number of authentication trials is n. The maximum number of authentication trials N is a maximum value of the number of authentication factors defined in the table illustrated in FIG. 5-3A. An initial value of each of the number of successful authentications x and the number of authentication trials n is 0. First, in step S804, the controller program 2 compares the number of authentication factors used X and the number of successful authentications x. In a case where the number of authentication factors used X is 0 (YES in step S804), that is, no authentication is necessary, the processing proceeds to step S810. In step S810, the controller program 2 executes the function checked in step S802 and ends the processing. In a case where the number of authentication factors X and the number of successful authentications x are not identical (NO in step S804), the processing proceeds to step S805. In step S805, the controller program 2 adds 1 to the number of authentication trials n. In step S806, the controller program 2 performs authentication with an n-th authentication factor defined in the table illustrated in FIG. 5-3B. For example, in a case where the number of authentication trials n is 1, the controller program 2 performs authentication with the user ID and the password. Similarly, in a case where the number of authentication trials n is 2, the controller program 2 performs authentication with the IC card. In step S807, the controller program 2 checks a result of the authentication and determines whether the authentication succeeds. In a case where the authentication succeeds (YES in step S807), the processing proceeds to step S808. In step S808, the controller program 2 adds 1 to the number of successful authentications x. In step S809, the controller program 2 compares the number of authentication factors used X and the number of successful authentications x. In a case where the number of authentication factors used X and the number of successful authentications x are identical (YES in step S809), that is, the number of authentication factors has been achieved, the processing proceeds to step S810. In step S810, the controller program 2 executes the function checked in step S802 and ends the processing. In a case where the number of authentication factors used X and the number of successful authentications x are not identical (NO in step S809), the processing proceeds to step S811. In step S811, the controller program 2 compares the maximum number of authentication trials N and the current number of authentication trials n. In a case where the maximum number of authentication trials N and the current number of authentication trials n are not identical (NO in step S811), the processing returns to step S805. In a case where the current number of authentication trials n has reached the maximum number of authentication trials N as a result of the comparison in step S811 (YES in step S811), the processing proceeds to step S812 and the controller program 2 performs the following processing. That is, the controller program 2 has not yet performed authentication with authentication factor(s) for the number of times set for the function. In step S812, the controller program 2 displays on the operation unit 3005 (not illustrated) that the authentication fails, and ends the processing without executing the function checked in step S802. FIG. 5-3B illustrates an example of n=3, but the number may be equal to or larger than 3, or equal to or smaller than 3. Entries for n rows are provided in the table in FIG. 5-3B. The order of authentication in the table in FIG. 5-3B can be edited by the administrator or the like, similarly to the table in FIG. 5-1 and the table in FIG. 5-2.

As described above, the operation unit 3005 illustrated in FIG. 4-1 and FIG. 3 has been discussed as an example of a first input unit that accepts an input of first authentication information.

The IC card reading unit 3011 illustrated in FIG. 1 and an interface unit 3012 for the IC card have been discussed as an example of a second input unit that accepts an input of another authentication information that is different from the first authentication information. In a case where priority levels of the first input unit and the second input unit are not set, there is no problem if the first input unit and the second input unit are replaced with each other.

Discussed above is the CPU 3201 that executes first processing on condition of success of authentication with authentication information input from the operation unit 3005 and success of authentication with authentication information input from the interface unit 3012 for the IC card. Examples of the first processing include processing of fax and processing of scan and send, each of which is illustrated in FIG. 5-1.

Authentication with the authentication information input from the operation unit 3005 or the authentication information input from the interface unit 3012 for the IC card or the like is performed. With success of at least one of the authentications with the input authentication information, processing for copy, the use save file function, the introduction of convenient functions, and the execution of the web browser, each of which is illustrated in FIG. 5-1, is permitted. The permission is controlled by the CPU 3201.

Examples of the first input unit include the IC card reading unit 3011. The IC card reading unit 3011 reads a bit sequence stored in the IC card, which is an example of a predetermined storage medium.

For example, the second input unit accepts an input of user-identification information and authentication information from the operation unit 3005, which is an example of an input device provided in the multi-function apparatus. Then, a user who has input the user-identification information is authenticated. The user-identification information is, for example, the user ID.

Examples of the first processing include processing of transmitting data stored in the multi-function apparatus to the network. The processing corresponds to, for example, the fax function and the scan and send function. Examples of second processing include processing of printing data stored in the information processing apparatus. In the table illustrated in FIG. 5-1, the administrator can set a desired function as the first processing or the second processing. The tables of FIGS. 5-1, 5-2, 5-3A, and 5-3B are merely examples.

The first input unit may be an interface unit that accepts an input of authentication information read by a device that reads data in the predetermined storage medium such as the IC card. The interface unit 3012 for the IC card has been discussed as an example of the interface unit.

The second input unit may be a touch panel unit or a keyboard from which an input operation can be made to the multi-function apparatus. Examples of the touch panel unit include the operation unit 3005. The keyboard is not illustrated. The CPU 3201 may execute a job involving network transmission on condition of success of the authentication with the authentication information input from the operation unit 3005 and success of the authentication with the authentication information input from the interface unit 3012.

The CPU 3201 may execute the following processing on condition of success of at least one of the authentication with the authentication information input from the operation unit 3005 or the authentication with the authentication information input from the interface unit 3012. For example, the CPU 3201 executes a job involving print but not involving network transmission.

The multi-function apparatus may further include n (n is 1 or more) input unit(s) that accept(s) an input of authentication information, as described with reference to FIGS. 5-3A and 5-3B.

The CPU 3201 checks authentication information input from the operation unit 3005, authentication information input from the interface unit 3012 for the IC card, and authentication information input from the above-described n input unit(s). The CPU 3201 may permit job execution controlled by the multi-function apparatus on condition of success of all of the authentications.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-031790, filed Mar. 1, 2021, which is hereby incorporated by reference herein in its entirety.

What is claimed is:

1. An image processing apparatus, comprising:
   a first input unit configured to accept an input of first authentication information to be used in a first authentication method;
   a second input unit configured to accept an input of second authentication information different from the authentication information, the second authentication information being to be used in a second authentication method;
   a third input unit configured to input third authentication information different from the first authentication information and the second authentication information, the third authentication information being to be used in a third authentication method;
   a scan unit configured to scan a document to generate image data;
   a print unit configured to print an image on a sheet;
   a transmit unit configured to transmit image data; and
   a controller having one or more processors and one or more memories, the controller being configured to:
   perform, based on success of an authentication based on the first authentication method, a login process;

receive, in a state that a user logs in to the image processing apparatus based on the login process, selection of a function button from a plurality of function buttons corresponding to a plurality of functions of the image processing apparatus, the plurality of functions including a copy function and a transmission function;

specify, based on the selection received in the state that the user logs in to the image processing apparatus based on the login process, an authentication method to be used for preforming a function corresponding to the selected function button;

in a case where the specified authentication method is the second authentication method, perform an authentication based on the second authentication method and perform, based on success of the authentication based on the second authentication method, the function corresponding to the selected function button; and in a case where the specified authentication method is the second authentication method and the third authentication method, perform an authentication based on the second authentication method and an authentication based on the third authentication method and perform, based on success of the authentication based on the second authentication method and the authentication based on the third authentication method, the function corresponding to the selected function button, wherein the first authentication method is an authentication method using an IC card, the second authentication method is an authentication method using a user ID and a password that are input by a user, and the third authentication method is an authentication method using biometric information.

2. The image processing apparatus according to claim 1, wherein the first input unit is a reading unit configured to accept the input of the first authentication information by reading authentication information stored in the IC card.

3. The image processing apparatus according to claim 1, wherein the second input unit is configured to accept the input of the user ID and the password from an input device of the image processing apparatus.

4. The image processing apparatus according to claim 1, wherein the first input unit is an interface unit configured to accept an input of the first authentication information read by a device configured to read the IC card, wherein the second input unit is a touch panel unit or a keyboard from which an input operation is made to the image processing apparatus.

5. A control method for an image processing apparatus including a scan unit that scans a document to generate image data, a print unit that prints an image on a sheet, and a transmit unit that transmits image data, the control method comprising:

accepting an input of first authentication information to be used in a first authentication method;

accepting an input of second another authentication information different from the authentication information, the second authentication information being to be used in a second authentication method;

accepting an input of third authentication information different from the first authentication information and the second authentication information, the third authentication information being to be used in a third authentication method;

performing, based on success of an authentication based on the first authentication method, a login process;

receiving, in a state that a user logs in to the image processing apparatus based on the login process, selection of a function button from a plurality of function buttons corresponding to a plurality of functions of the image processing apparatus, the plurality of functions including a copy function and a transmission function;

specifying, based on the selection received in the state that the user logs in to the image processing apparatus based on the login process, an authentication method to be used for preforming a function corresponding to the selected function button;

in a case where the specified authentication method is the second authentication method, performing an authentication based on the second authentication method and performing, based on success of the authentication based on the second authentication method, the function corresponding to the selected function button; and in a case where the specified authentication method is the second authentication method and the third authentication method, performing an authentication based on the second authentication method and an authentication based on the third authentication method and performing, based on success of the authentication based on the second authentication method and the authentication based on the third authentication method, the function corresponding to the selected function button, wherein the first authentication method is an authentication method using an IC card, the second authentication method is an authentication method using a user ID and a password that are input by a user, and the third authentication method is an authentication method using biometric information.

6. The control method for the image processing apparatus according to claim 5, wherein the input of the first authentication information is accepted by reading authentication information stored in the IC card.

7. The control method for the image processing apparatus according to claim 5, wherein the user ID and the password are input from an input device of the information processing apparatus.

8. A non-transitory computer-readable medium storing executable instructions, which when executed by one or more processors of an image processing apparatus including a scan unit that scans a document to generate image data, a print unit that prints an image on a sheet, and a transmit unit that transmits image data, cause the image processing apparatus to perform a method comprising:

accepting an input of first authentication information to be used in a first authentication method;

accepting an input of second authentication information different from the authentication information, the second authentication information being to be used in a second authentication method;

accepting an input of third authentication information different from the first authentication information and the second authentication information, the third authentication information being to be used in a third authentication method;

performing, based on success of an authentication based on the first authentication method, a login process;

receiving, in a state that a user logs in to the image processing apparatus based on the login process, selection of a function button from a plurality of function buttons corresponding to a plurality of functions of the image processing apparatus, the plurality of functions including a copy function and a transmission function;

specifying, based on the selection received in the state that the user logs in to the image processing apparatus based on the login process, an authentication method to be used for preforming a function corresponding to the selected function button;

in a case where the specified authentication method is the second authentication method, performing an authentication based on the second authentication method and performing, based on success of the authentication based on the second authentication method, the function corresponding to the selected function button; and in a case where the specified authentication method is the second authentication method and the third authentication method, performing an authentication based on the second authentication method and an authentication based on the third authentication method and performing, based on success of the authentication based on the second authentication method and the authentication based on the third authentication method, the function corresponding to the selected function button, wherein the first authentication method is an authentication method using an IC card, the second authentication method is an authentication method using a user ID and a password that are input by a user, and the third authentication method is an authentication method using biometric information.

* * * * *